UNITED STATES PATENT OFFICE.

LÉON FRANÇOIS MASCART, OF PARIS, FRANCE, ASSIGNOR TO SOCIÉTÉ DU VERRE TRIPLEX, OF PARIS, FRANCE.

MANUFACTURE OF REINFORCED GLASS.

1,342,268.     Specification of Letters Patent.     Patented June 1, 1920.

No Drawing. Original application filed March 21, 1914, Serial No. 826,411. Divided and this application filed September 12, 1918. Serial No. 253,790.

*To all whom it may concern:*

Be it known that I, LÉON FRANÇOIS MASCART, a citizen of the Republic of France, residing at 17 Rue Desnouettes, Paris, France, have invented a certain new and Improved Manufacture of Reinforced Glass, of which the following is a specification.

In the manufacture of glass strengthened or reinforced by an adherent sheet of celluloid, cellulose ester, or other suitable material, in which the adhesion of the cellulose product, etc., to the glass is secured by an intermediate layer of gelatin, it is important to use hard gelatin, *i. e.*, gelatin which is naturally hard or which has been artificially hardened, or tanned, or rendered insoluble. In other words, it is highly desirable to use gelatin which can resist the destructive action of the moisture of the air and can withstand a large increase in temperature without having a tendency to melt or run. The present invention relates to improvements in the method of making such an article and in the article itself, with special reference to securing a perfect adhesion of the gelatin (whatever its nature and state) not only to the surface of the glass, which does not offer any serious difficulty when the gelatin is spread thereon, but also to the surface of the cellulose ester used with the gelatin as the strengthening medium.

As hereinafter described, the adhesion of the gelatin to the glass is obtained in a very simple manner by simply applying, in any suitable way, a layer of an aqueous solution of the gelatin to the glass (which has been previously properly cleaned), and then allowing the gelatin to dry. The layer of gelatin thus obtained can be hardened, tanned, or rendered insoluble by any of the well-known processes; for example, by treatment with bichromate of potash, formalin, etc. The chief difficulty heretofore experienced, and which is overcome by the present invention, relates to the securing of a firm adhesion of this layer of hard gelatin, which has been rendered insoluble, to the cellulose ester usually forming the main strengthening element of the structure. The problem may be solved in various ways, some of which are set forth in my co-pending application filed March 21, 1914, Serial No. 826,411, of which the present application is a division. The solution of the problem which forms the subject of the present application consists in mechanically or chemically treating the surface of the sheet of cellulose ester before it is brought into adhesion with the gelatin. To this end, the surface of the sheet of cellulose ester is slightly roughened. This may be accomplished mechanically by means of a sandblast. Alternatively, it may be accomplished by subjecting the surface of the sheet to the chemical action of a reducing agent; for instance, an alkaline sulfid or any of the agents for denitrating nitrocellulose. The sheet with its surface thus mechanically or chemically treated adheres to a sheet of gelatin if the two sheets are dipped into alcohol and pressed against one another in the presence of heat.

If, instead of using nitrocellulose or celluloid, sheets comprising a mixture of celluloid and cellulose acetate, such as are industrially prepared, be used, the same process remains applicable. Sheets of cellulose acetate, or other similar esters which do not contain nitrocellulose, may be subjected to the action of a hot alkaline solution.

Instead of pressing a sheet of cellulose ester or the like (with its surface treated in the manner specified) against a sheet of gelatin, it is possible to effect substantially the same results by dipping the treated sheet of cellulose ester into a hot solution of gelatin and letting the gelatin dry thereon. The thus coated sheet of cellulose ester, after it has dried, may be dipped into alcohol and pressed between two sheets of glass, either uncoated or coated with gelatin, and in the presence of heat.

In all the cases described a greatly improved adhesion between the cellulose ester and gelatin layers is secured, even when the layers of gelatin and cellulose ester are exceedingly thin.

Obviously, the process may be applied to the manufacture of an article comprising but a single sheet of glass reinforced on one face or on both faces, or to a glass sandwich comprising two sheets of glass with an interposed reinforce of gelatin and cellulose ester layers of the type described; or, again, to the manufacture of an article comprising more than two sheets of glass, the several sheets being united and reinforced in the manner specified.

Glass prepared in the present manner has a solidity and perfect adhesion between the elements which compose it superior to that heretofore attained. If the gelatin has been suitably hardened and rendered insoluble, it resists the action of water and heat and can be used just as it is. The layer of cellulose ester must not be too thin. It must be at least 0.1–0.2 mm. thick in order to form a sufficiently strong reinforce. Finally, inasmuch as this reinforce is exposed either on its face or at its margins, it is important that it should be incombustible, and it is therefore advisable to make it of cellulose acetate.

I claim:—

1. As a new article of manufacture, reinforced glass comprising a sheet of glass faced by a layer of gelatin adherent thereto, together with a layer of cellulose ester adherent to the gelatin, the face of the cellulose ester layer having a surface characteristic promoting the adhesion of the gelatin thereto.

2. As a new article of manufacture, reinforced glass comprising a sheet of glass faced by a layer of gelatin adherent thereto, together with a layer of cellulose ester adherent to the gelatin, the surface of the cellulose ester layer being roughened to promote the adhesion of the gelatin thereto.

3. As a new article of manufacture, reinforced glass comprising a sheet of glass faced by a layer of gelatin adherent thereto, together with a layer of cellulose ester adherent to the gelatin and having its surface chemically roughened to promote the adhesion of gelatin thereto.

4. As a new article of manufacture, reinforced glass comprising a sheet of glass faced by a layer of gelatin adherent thereto, together with a layer of cellulose ester adherent to the gelatin, the face of the cellulose ester layer having its surface roughened by a reducing agent to promote the adhesion of the gelatin thereto.

5. As a new article of manufacture, reinforced glass comprising a sheet of glass faced by a layer of gelatin and a layer of cellulose ester, the layer of cellulose ester having a surface characteristic promoting the adhesion of gelatin thereto, the parts being united under pressure in the presence of heat.

6. In the process of making glass reinforced by adherent layers of gelatin and cellulose ester, the step of altering the surface characteristic of the cellulose ester layer to promote its adhesion to the gelatin.

7. In the process of making glass reinforced by adherent layers of gelatin and cellulose ester, the step of roughening the surface of the cellulose ester layer to promote its adhesion to the gelatin.

8. In the process of making glass reinforced by adherent layers of gelatin and cellulose ester, the step of subjecting the surface of the cellulose ester layer to chemical action to alter its surface characteristics and thereby promote the adhesion of gelatin thereto.

9. In the process of making glass reinforced by adherent layers of gelatin and cellulose ester, the step of subjecting the cellulose ester layer to the action of a reducing agent in order to alter its surface characteristics and thereby promote its adhesion to the gelatin.

In testimony whereof I have signed my name to this specification.

LÉON FRANÇOIS MASCART.